(12) United States Patent
Zhang et al.

(10) Patent No.: US 7,996,130 B2
(45) Date of Patent: *Aug. 9, 2011

(54) DRIVER WORKLOAD-BASED VEHICLE STABILITY ENHANCEMENT SYSTEM

(75) Inventors: Yilu Zhang, Northville, MI (US); William C. Lin, Birmingham, MI (US); Jing Zhang, Grosse Pointe Park, MI (US); Yuen-Kwok Chin, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,739

(22) Filed: Apr. 19, 2010

(65) Prior Publication Data

US 2010/0198452 A1 Aug. 5, 2010

Related U.S. Application Data

(63) Continuation of application No. 11/403,359, filed on Apr. 13, 2006, now Pat. No. 7,751,960.

(51) Int. Cl.
*B62D 6/00* (2006.01)

(52) U.S. Cl. ............... 701/42; 701/36; 701/41; 340/439

(58) Field of Classification Search .................... 701/39, 701/40, 42, 43, 70, 76, 77, 82, 90, 91, 92, 701/41; 303/140, 146; 340/438, 439, 441, 340/575, 576

See application file for complete search history.

(56) References Cited

U.S. PATENT DOCUMENTS

| | | | | |
|---|---|---|---|---|
| 5,075,881 A * | 12/1991 | Blomberg et al. | ............... | 703/2 |
| 5,720,533 A * | 2/1998 | Pastor et al. | ................. | 303/147 |
| 5,931,887 A * | 8/1999 | Hac | ............................... | 701/71 |
| 6,061,610 A * | 5/2000 | Boer | ............................... | 701/1 |
| 6,995,663 B2 * | 2/2006 | Geisler et al. | ................ | 340/439 |
| 2004/0154848 A1 * | 8/2004 | Kitagawa et al. | ............ | 180/170 |
| 2004/0199321 A1 * | 10/2004 | Lin et al. | ........................ | 701/70 |
| 2004/0249533 A1 * | 12/2004 | Wheals et al. | .................. | 701/36 |
| 2007/0182529 A1 * | 8/2007 | Dobler et al. | ................ | 340/438 |

FOREIGN PATENT DOCUMENTS

WO    WO 2004101306 A1 * 11/2004

OTHER PUBLICATIONS

Kruger, "A Workload Approach to the Evaluation of Vehicle Handling Characteristics", Mar. 2000, SAE Technical Paper Series, 2000-01-0170, pp. 1-11., SAE 2000 World Congress, Detroit, MI.*

* cited by examiner

*Primary Examiner* — Khoi Tran
*Assistant Examiner* — Spencer Patton
(74) *Attorney, Agent, or Firm* — John A. Miller; Miller IP Group, PLC

(57) ABSTRACT

A vehicle stability enhancement system that is adapted for an estimated driver workload. The system includes a driver workload estimation processor that estimates the driver workload based on certain factors, such as the vehicle speed or driver-behavior factors. The driver workload estimation is used to adjust the damping ratio and natural frequency in dynamic filters in a command interpreter to adjust a desired yaw rate signal and a desired side-slip signal. The driver workload estimation is also used to generate a yaw rate multiplication factor and a side-slip multiplication factor that modify a yaw rate stability signal and a side-slip stability signal in a feedback control processor that generates a stability control signal.

13 Claims, 7 Drawing Sheets

DRIVER WORKLOAD-BASED VEHICLE STABILITY ENHANCEMENT SYSTEM

CROSS-REFERENCE TO RELATED APPLICATIONS

This application is a Continuation application of U.S. patent application Ser. No. 11/403,359, titled Driver Workload-Based Vehicle Stability Enhancement Control, filed Apr. 13, 2006.

BACKGROUND OF THE INVENTION

1. Field of the Invention

This invention relates generally to a vehicle stability enhancement system and, more particularly, to a vehicle stability enhancement system that employs a driver workload estimator for estimating the driver workload.

2. Discussion of the Related Art

Modern vehicles sometimes incorporate active vehicle control systems. One such system is known as a vehicle stability enhancement (VSE) system that assists the vehicle operator in providing vehicle handling on surfaces such as wet or uneven pavement, ice, snow or gravel. The VSE system typically senses wheel skid based on inputs from a wheel speed sensor, a steering angle sensor, a vehicle speed sensor and a vehicle yaw rate sensor. The VSE system uses these inputs to reduce engine torque and apply differential braking to help maintain the vehicle travel along the intended path.

Additionally, active chassis control systems have been emerging in the art that are used in combination with VSE systems. The chassis control systems typically include differential braking control, real-time suspension damping, rear-wheel steering and active front steering control. With the capability of controlling chassis dynamics in real time, the active chassis control systems can be used to enhance the vehicle handling performance.

Another active vehicle control system is known as an active front steering (AFS) system that provides automatic front-wheel steering. AFS systems typically employ a steering actuator system that receives an operator intended steering signal from a hand-wheel sensor, a vehicle speed signal and a vehicle yaw rate signal, and provides a correction to the operator steering signal to cause the vehicle to more closely follow the vehicle operator's intended steering path to increase vehicle stability and handling. The AFS system is able to provide steering corrections much quicker than the vehicle operator's reaction time, so that the amount of operator steering is reduced. The AFS system provides a more direct vehicle steering under normal road conditions at low and medium speeds, reducing operator steering effort. The AFS system also may help to increase vehicle agility in city traffic or during parking maneuvers. The AFS system also provides less direct vehicle steering at higher vehicle speeds.

Vehicle stability enhancement systems measure the driver's desire of vehicle maneuvers to control inputs, such as steering wheel, brake pedal, etc., and compare the vehicle response with the desired maneuver. The design of a vehicle stability enhancement system usually includes a command interpreter to determine the driver's desire, and a feedback control for vehicle yaw-rate and lateral dynamics to control the vehicle response to meet the driver's intended performance.

The known vehicle stability enhancement systems do not consider the driver's physical and mental status, and cannot identify certain situations when a driver needs additional help. A better design for a vehicle stability enhancement system may fulfill the driver's desire of performance driving. When the level of the driver's workload is recognized, the information of the workload can be used to make further adjustments in the command interpreter and the feedback control.

SUMMARY OF THE INVENTION

In accordance with the teachings of the present invention, a vehicle stability enhancement system is disclosed that is adapted for an estimated driver workload level. The system includes a driver workload estimation processor that estimates the driver workload based on certain factors, such as one or more of vehicle speed, ambient light, steering angle, lateral acceleration, lane position, driver gaze position, driver pupil diameter, inclement weather, traffic fluidity, road geometry and driver behavior factors. The driver workload estimation is used to adjust the damping ratio and natural frequency in dynamic filters in a command interpreter to adjust a desired yaw rate signal and a desired side-slip signal. The driver workload estimation is also used to generate a yaw rate multiplication factor and a side-slip multiplication factor that modify a yaw rate stability signal and a side-slip stability signal in a feedback control processor that generates a stability control signal.

Additional features of the present invention will become apparent from the following description and appended claims, taken in conjunction with the accompanying drawings.

DETAILED DESCRIPTION OF THE EMBODIMENTS

Figure 1:
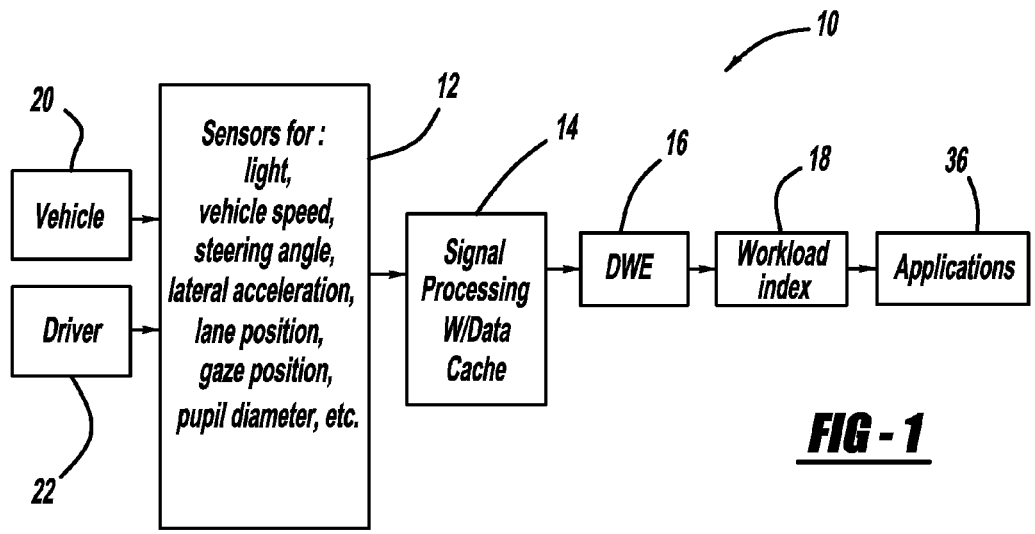
FIG. 1 is a block diagram of a process for providing a driver workload estimation, according to an embodiment of the present invention.

The following discussion of the embodiments of the invention directed to a vehicle stability enhancement system employing driver workload estimation is merely exemplary in nature, and is in no way intended to limit the invention or its applications or uses.

As will be discussed in detail below, the present invention determines a driver workload estimation (DWE) index that is then used as part of the stability enhancement in a vehicle stability enhancement (VSE) system. As has been discussed in the prior art, the term workload refers to that portion of the operator's limited capacity actually required to perform a particular task. In the vehicle environment, the particular task refers to both the vehicle control, which is the primary task, and other secondary tasks or activities, such as listening to the radio. The goal of the DWE index is to estimate the total amount of burden or required capacity that the driver bears from both the primary and secondary tasks while the driver is driving the vehicle. Because the actual workload level is internal to the driver, and not directly observable, the DWE index can only infer the driver's workload based on the information that is observable. In general, a DWE module receives sensory information from the vehicle, the driver and the environment and generates an index of the driver's workload level. The driver workload estimation index can be either a numerical number, such as a number ranging between 0 and 10, where 10 represents the highest workload, or a categorical description, such as low, medium or high.

In practice, determining the DWE index can be performed by different approaches. A first approach may use task demands for environmental factors as the indicators of the driver's workload level. High vehicle speed, inclement weather, low ambient light conditions, etc. are considered high workload inducers. Traffic fluidity and road geometry are also used as factors to infer workload level.

In one simple form, a task demand-based workload estimator can be based on vehicle speed. For example, if the vehicle speed is less than 5 mph, then the driver workload level is 0. If the vehicle speed is greater than 5 mph and less than 20 mph, then the driver workload level is 1. If the vehicle speed is greater than 20 mph, then the driver workload level is 2. The limitation of this approach is the ignorance of driver's individual differences. The exact same external driving conditions can elicit different impacts on different drivers. For example, novice drivers bear more of a burden because they do not know an efficient way of monitoring and judging the driving conditions. Even for the same driver, the workload can be different under the same external driving conditions. For example, a driver's workload is higher when the driver is looking for a certain restaurant than when he is just driving through.

A second approach can use the measurement of the driver's behavior as the indicator of the driver's workload level. These measurements include driving performance, such as speed deviation, and physiological measures, such as the driver's eye movements. These measurements directly reflect the degree to which the driver is engaged in driving, and the capability of the driver to handle maneuvers and secondary tasks. Therefore, there are better workload indicators than task demands. This approach has been widely used in offline assessment and manual analysis of the driver's workload.

It is considered difficult to design an online workload estimation system that automatically estimates workload based on driver's behavior. However, U.S. patent application Ser. No. 11/195,469, titled Adaptive Driver Workload Estimator, filed Aug. 2, 2005, assigned to the Assignee of this application and herein incorporated by reference discloses one such attempt to provide a driver workload estimate.

The following is a summary of the behavior-based workload discussed in patent application Ser. No. 11/195,469. Data is collected while a driver drives a vehicle during pre-designed experiments. The data includes sensory information of maneuvering the vehicle, such as lane position, that reflects the driver's driving performance, and the driver's overt behavior, such as eye movement and heartbeat, depending on the availability of sensors on the designated vehicle. The data includes the subjective workload rating and/or the secondary-task performance rating of the subjects assessed at a reasonable frequency, such as 1 Hz. This data serves as training labels. Next, some preprocessing is conducted on the sensory inputs to generate features. Each feature is a vector of values, such as the means and standard deviations of the sensor inputs over a time window. The duration of the time window is determined so that there is at least one training label within one time window. The features and their corresponding labels form a training set. A learning method is then used to extract a map that is the DWE index that gives a feature in the training set, and can correctly produce the corresponding label. Depending on the machine/learning method used, which can include, but is not limited to, decision trees, artificial neural networks, Bayes learning, hidden Markov models, Bayesian belief networks, case based reasoning, genetic algorithms, etc., the learned DWE can be a set of rules, a look-up table, or a numerical function, depending on the algorithm used. Using this design method, a driver workload estimator is established.

The level of the driver's workload has an impact on how the driver can handle the vehicle properly, especially under the difficult situations of a limit-handling condition. When the vehicle is under an at-limit maneuver, the vehicle dynamic stability is an issue, and the driver needs to do his best to stabilize the vehicle. With the vehicle stability enhancement control, the driver's effort necessary to stabilize the vehicle is drastically reduced. Nevertheless, it requires the driver's mental resources for visual perception, special processing, decision making and manual response execution under such conditions. A high-workload condition limits the resources allocated for vehicle handling. As a result, the driver is left with a reduced capacity in making corrective judgment of the road/traffic conditions and conducting prompt responsive maneuvering.

There has been a large amount of research effort on the effect of high workload to vehicle handling. Drivers with a high workload were observed to have a difficult time maintaining the vehicle in a lane, encountered longer delays in braking, made incorrect steering decisions, etc. Therefore, it is the purpose of this invention to incorporate the information of the driver's workload to vehicle stability enhancement control and to further assist the driver to handle the vehicle under the limit-handling maneuvers.

A driver responds to vehicle maneuvers in two aspects, particularly, vehicle yaw motion and vehicle lateral motion. Given the same workload capacity without being distracted from any secondary controls, such as a radio, information systems, entertainment systems, etc., a skilled driver can respond to the vehicle dynamics with a higher degree of yaw motion and more significant vehicle side-slip motion, while a novice driver would feel uncomfortable experiencing such a high degree of vehicle dynamic response. If the vehicle yaw rate or lateral dynamics become excessive, a novice driver will not be able to handle the control of the vehicle, and may result in loss of vehicle stability.

As the workload of a driver varies the capacity of handling the vehicle changes accordingly. An expert driver may be caught with a reduced capacity unexpectedly under the situation of a high workload, rendering him incapable of handling the degree of vehicle yaw rate as he would have been able to do otherwise. Therefore, adjusting the vehicle stability control under this situation will be helpful to the driver.

Figure 2:
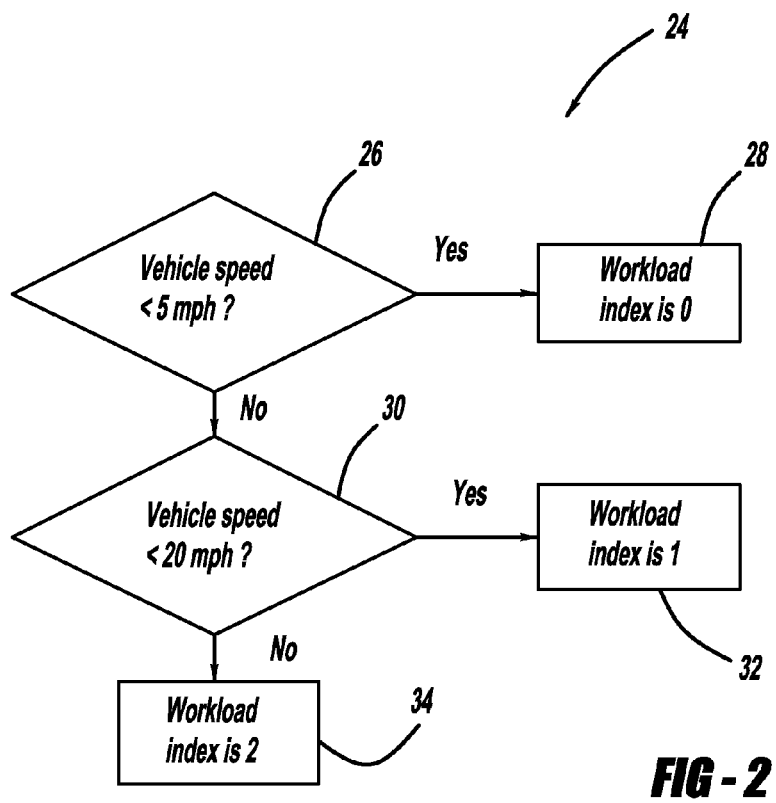
FIG. 2 is a flow chart diagram showing a process for providing a driver workload estimation based on vehicle speed, according to an embodiment of the present invention.
Figure 3:
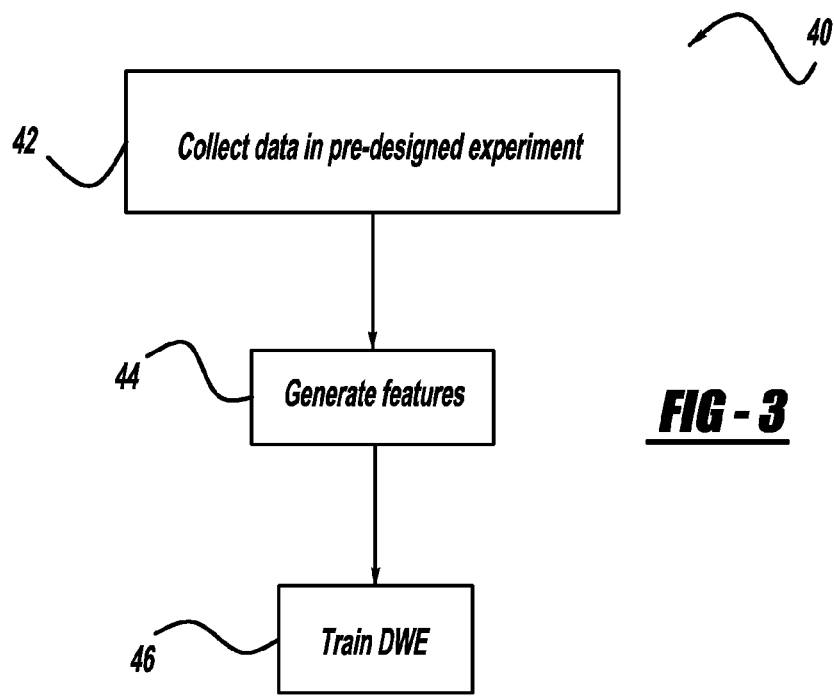
FIG. 3 is a flow chart diagram showing a process for a learning-based driver workload estimation, according to an embodiment of the present invention.

FIGS. 1-3 give a pictorial representation of the discussion above. Particularly, FIG. 1 is a block diagram of a system 10 illustrating a process for determining a DWE index. Vehicle information from a vehicle 20, such as ambient light, vehicle speed, steering angle, lateral acceleration, lane position, etc. and driver information from a driver 22, such as gaze position, pupil diameter, etc. at box 12 are input into a signal processor 14 that includes a data cache. The signal processor 14 uses this information to generate the DWE at box 16, using either of the two approaches discussed above. From the DWE, a driver workload index is generated at box 18.

FIG. 2 is a flow chart diagram 24 for generating the workload index based on vehicle speed, where the vehicle speed is the only factor used to determine the workload estimation. Particularly, if the vehicle speed is less than 5 mph at decision diamond 26 then the DWE index is set to 0 at box 28. If the vehicle speed is 5 mph or greater at the decision diamond 26, then the algorithm determines whether the vehicle speed is less than 20 mph at decision diamond 30. If the vehicle speed is less than 20 mph then the DWE index is set to 1 at box 32, otherwise the DWE index is set to 2 at box 34. In this example, a lower workload index indicates a lower driver workload estimation. In this example, only three workload indexes are generated, however, as will be appreciated by those skilled in the art, more workload indexes can be generated for a higher degree of resolution. The workload index is then used in various applications at box 36, such as a vehicle stability enhancement system.

FIG. 3 is flow chart diagram 40 showing a process for determining a behavior-based DWE as discussed above. At box 42, data is collected in pre-designed experiments, including sensor input of vehicle data and driver behavior data, and labels of driver's subjective workload rating and/or secondary task performance rating. Using this information, the algorithm generates features, where each feature is a vector of values, such as the means and standard deviations of the sensory inputs over a time window, at box 44. The algorithm then trains the DWE at box 46 using machine-learning methods, such as decision trees, neural networks, etc., to extract a map that a given feature in the training set can correctly produce the corresponding label.

Figure 4:
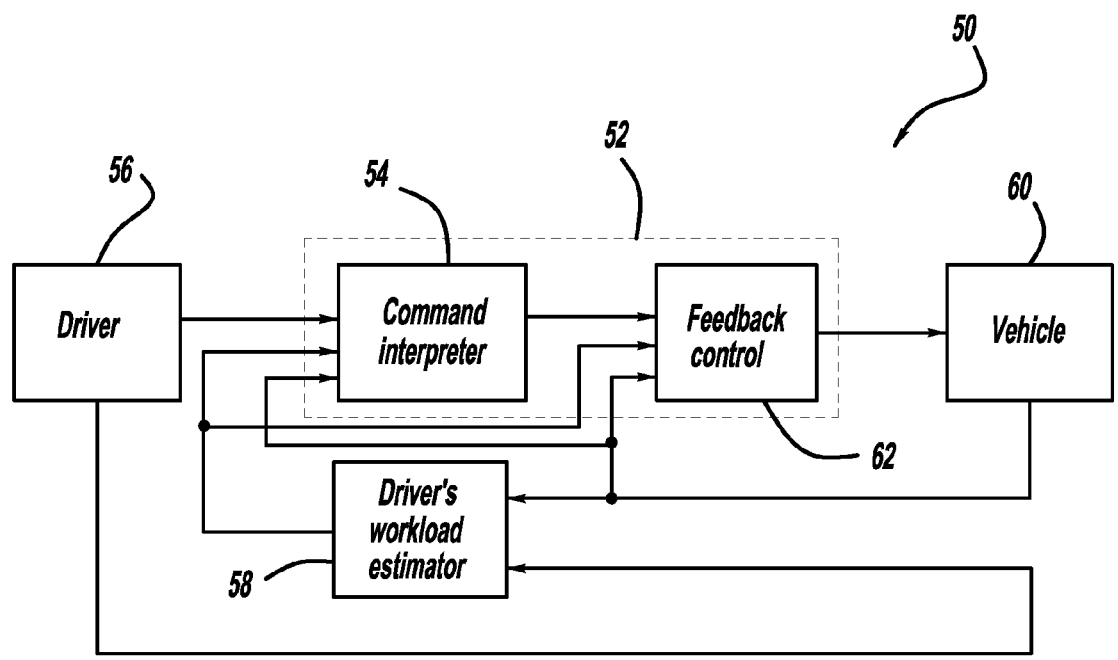
FIG. 4 is a block diagram of a vehicle stability enhancement system including a driver workload estimator, according to an embodiment of the present invention.

FIG. 4 is a block diagram of a vehicle system 50 including a VSE system 52. The VSE system 52 includes a command interpreter 54 and a feedback control processor 62. Both the command interpreter 54 and the feedback control processor 62 receive a DWE index from a driver workload estimator 58 that identifies the DWE index based on the techniques discussed above or other suitable techniques. As will be discussed in detail below, the command interpreter 54 receives certain driver based signals from a driver 56 and provides a desired yaw rate signal r* and a desired side-slip velocity signal $V^*_y$. The feedback control processor 62 provides a VSE control signal that controls the desired systems in a vehicle 60, such as differential braking, active front steering, vehicle suspension, etc. The measured yaw rate signal r from a yaw rate sensor and the measured side-slip velocity signal $V_y$ from a lateral acceleration sensor are fed-back to the feedback control processor 62 to provide a yaw rate error signal of the difference between the desired yaw rate and the measured yaw rate and a side-slip error signal of the difference between the desired side-slip velocity and the measured side-slip velocity. The yaw rate error signal and the side-slip velocity error signal are used by the feedback control processor 62 to generate the VSE control signal.

Figure 5:
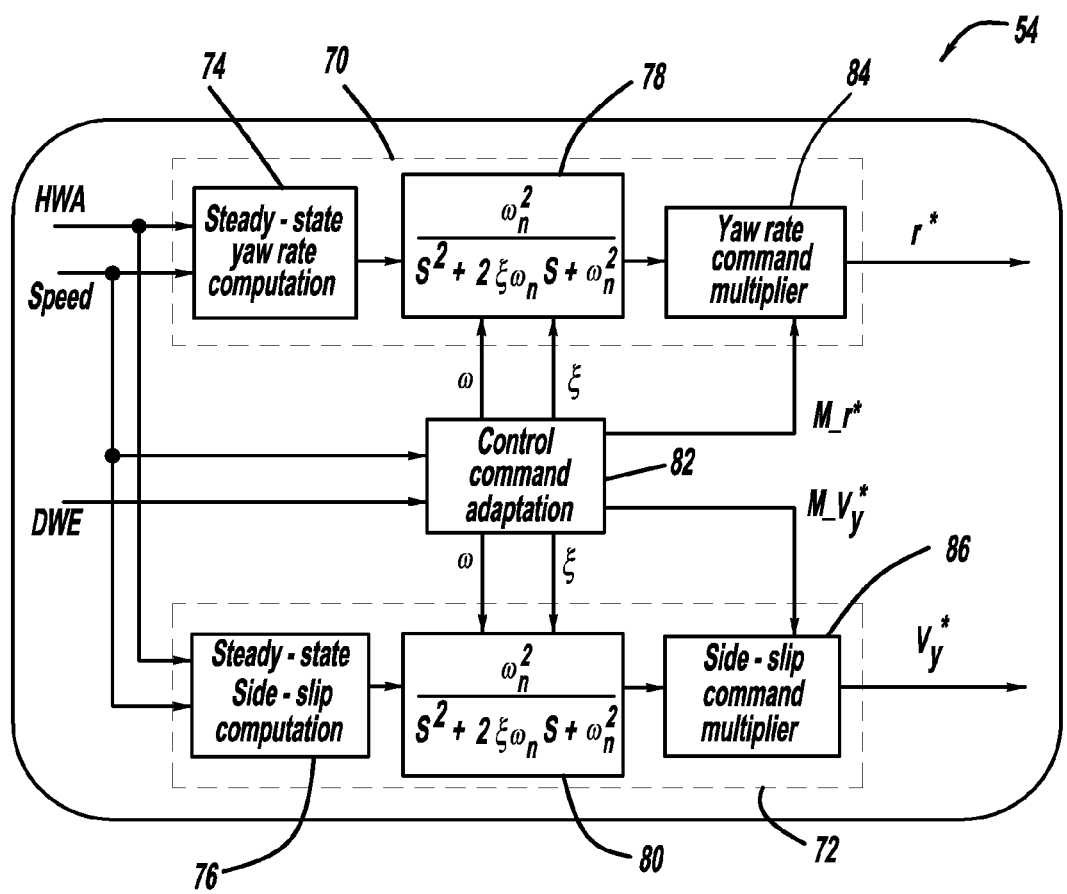
FIG. 5 is a block diagram of a command interpreter with command adaptation based on the driver workload estimation used in the vehicle stability enhancement system shown in FIG. 4.

FIG. 5 is a block diagram of the command interpreter 54. The command interpreter 54 includes a yaw rate command generator 70 that outputs the desired yaw rate signal r* based on the driver intent and a side-slip velocity command generator 72 that outputs the desired vehicle side-slip velocity signal $V^*_y$ based on the driver intent. The yaw rate command generator 70 includes a steady-state yaw rate computation processor 74 and the side-slip velocity command generator 72 includes a steady-state side-slip computation processor 76 that receive a hand-wheel angle (HWA) signal from a hand-wheel angle sensor and the vehicle speed signal Vx from a vehicle speed sensor. The yaw rate computation processor 74 includes a look-up table that provides a steady-state yaw rate signal based on the hand-wheel angle signal and the vehicle speed signal Vx and the side-slip computation processor 76 includes a look-up table that provides a steady-state side-slip signal based on the hand-wheel angle signal and the vehicle speed signal Vx. Those skilled in the art will readily recognize how to generate the look-up tables for this purpose.

The steady-state yaw rate signal is processed by a damping filter 78 in the generator 70 and the steady-state side-slip signal is processed by a damping filter 80 in the generator 72, where the damping filters 78 and 80 are second order filters characterized by a damping ratio $\xi$ and a natural frequency $\omega_n$. In the known command interpreters for vehicle stability systems, the damping ratio $\xi$ hand the natural frequency $\omega_n$ are typically a function of vehicle speed. According to the invention, the damping filter 78 and the damping filter 80 receive a control command adaptation signal from a control command adaptation processor 82 that identifies the damping ratio $\xi$ and the natural frequency $\omega_n$ for a particular DWE index determined by the estimator 58. Particularly, the present invention proposes adapting the damping ratio $\xi$ and the natural frequency $\omega_n$ in the filters 78 and 80 to the workload of the driver so that the VSE system 52 can better control the vehicle 60. As will be discussed in more detail below, look-up tables can be used to identify the damping ratio $\xi$ and the natural frequency $\omega_n$ based on the DWE index and the vehicle speed signal Vx.

The control command adaptation processor 82 also generates a desired yaw rate multiplier M_r* and a desired side-slip multiplier $M\_V^*_y$. The filtered steady-state yaw rate signal from the damping filter 78 is multiplied by the yaw rate multiplier M_r* in a yaw rate command multiplier 84 to provide the desired yaw rate signal r* that has been influenced by the DWE index. Likewise, the filtered steady-state side-slip signal from the damping filter 80 is multiplied by the side-slip multiplier $M\_V^*_y$ in a side-slip command multiplier 86 to provide the desired side-slip velocity signal $V^*_y$ that has been influenced by the DWE index.

Figure 6:
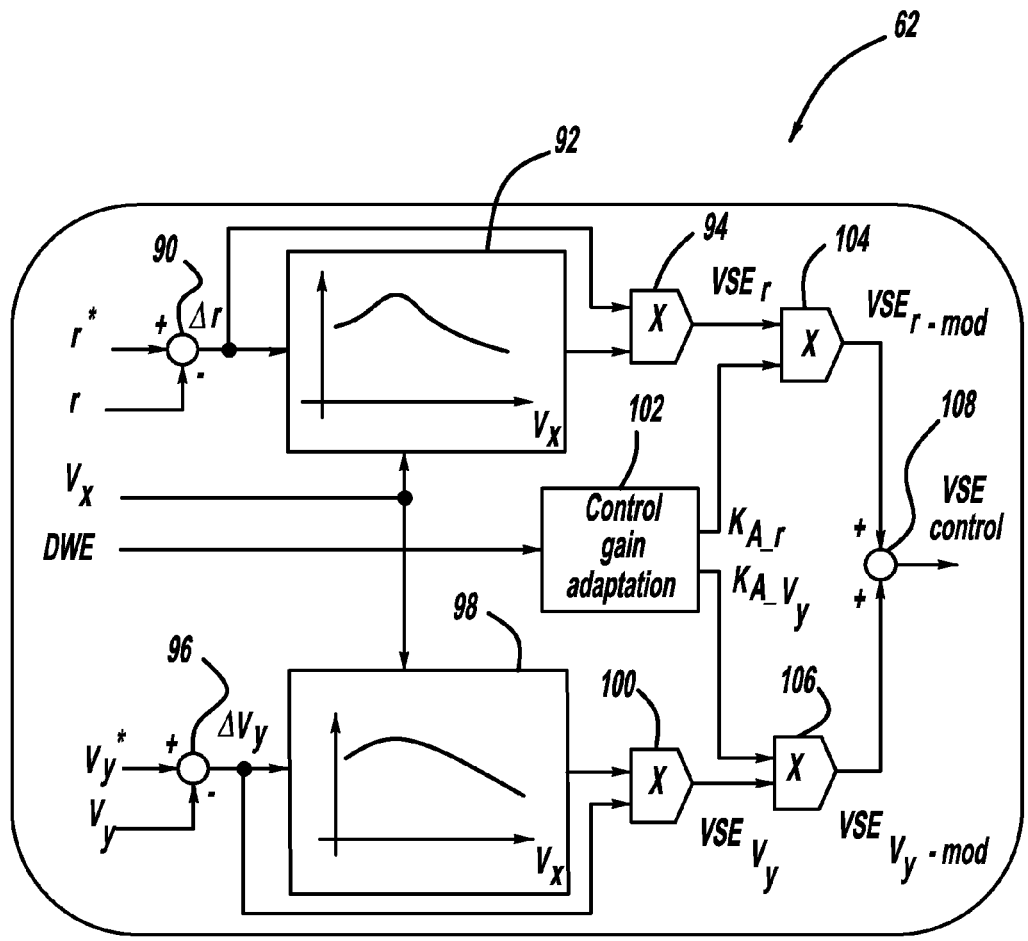
FIG. 6 is block diagram of a feedback control processor employing control gain adaptation based on the driver workload estimation in the vehicle stability enhancement system shown in FIG. 4.

FIG. 6 is a block diagram of the feedback control processor 62 that receives the desired yaw rate signal r* and the desired vehicle side-slip velocity signal $V^*_y$ from the generators 70 and 72, respectively. The desired yaw rate signal r* and the measured yaw rate signal r are compared in a subtractor 90 to generate the yaw rate error signal Δr. The yaw rate error signal Δr and the vehicle speed signal Vx are applied to a look-up table 92 that provides a yaw rate control gain signal. The yaw rate control gain signal is multiplied by the yaw rate error signal Δr in a multiplier 94 to generate a yaw rate vehicle stability signal $VSE_r$. Likewise, the desired side-slip signal $V^*_y$ and the measured side-slip signal $V_y$ are compared in a subtractor 86 to generate the side-slip error signal $\Delta V_y$. The side-slip error signal $\Delta V_y$ and the vehicle speed signal Vx are applied to a look-up table 98 that provides a side-slip control gain signal. The side-slip control gain signal and the side-slip error signal $\Delta V_y$ are multiplied by a multiplier 100 to generate a side-slip vehicle stability signal $VSE_{Vy}$.

In the known vehicle stability systems, the yaw rate vehicle stability signal $VSE_r$ and the side-slip vehicle stability signal $VSE_{Vy}$ were added to provide the VSE control component. According to the invention, the DWE index is applied to a control gain adaptation processor 102 that determines a yaw rate multiplier factor $K_{A\_r}$ and a side-slip multiplier factor $K_{A\_Vy}$. The yaw rate stability signal $VSE_r$ and the multiplier factor $K_{A\_Vy}$ are multiplied by a multiplier 104 to generate a modified yaw rate stability signal $VSE_{r-mod}$, and the side-slip stability signal $VSE_{Vy}$ and the multiplier factor $K_{A\_Vy}$ are multiplied by a multiplier 106 to generate a modified side-slip stability signal $VSE_{Vy-mod}$. The modified yaw rate stability signal $VSE_{r-mod}$ and the modified side-slip stability signal $VSE_{Vy-mod}$ are then added by an adder 108 to provide the VSE control signal that controls the various stability enhancement components in the vehicle 60, such as differential braking and active steering, as discussed above.

Figure 7:
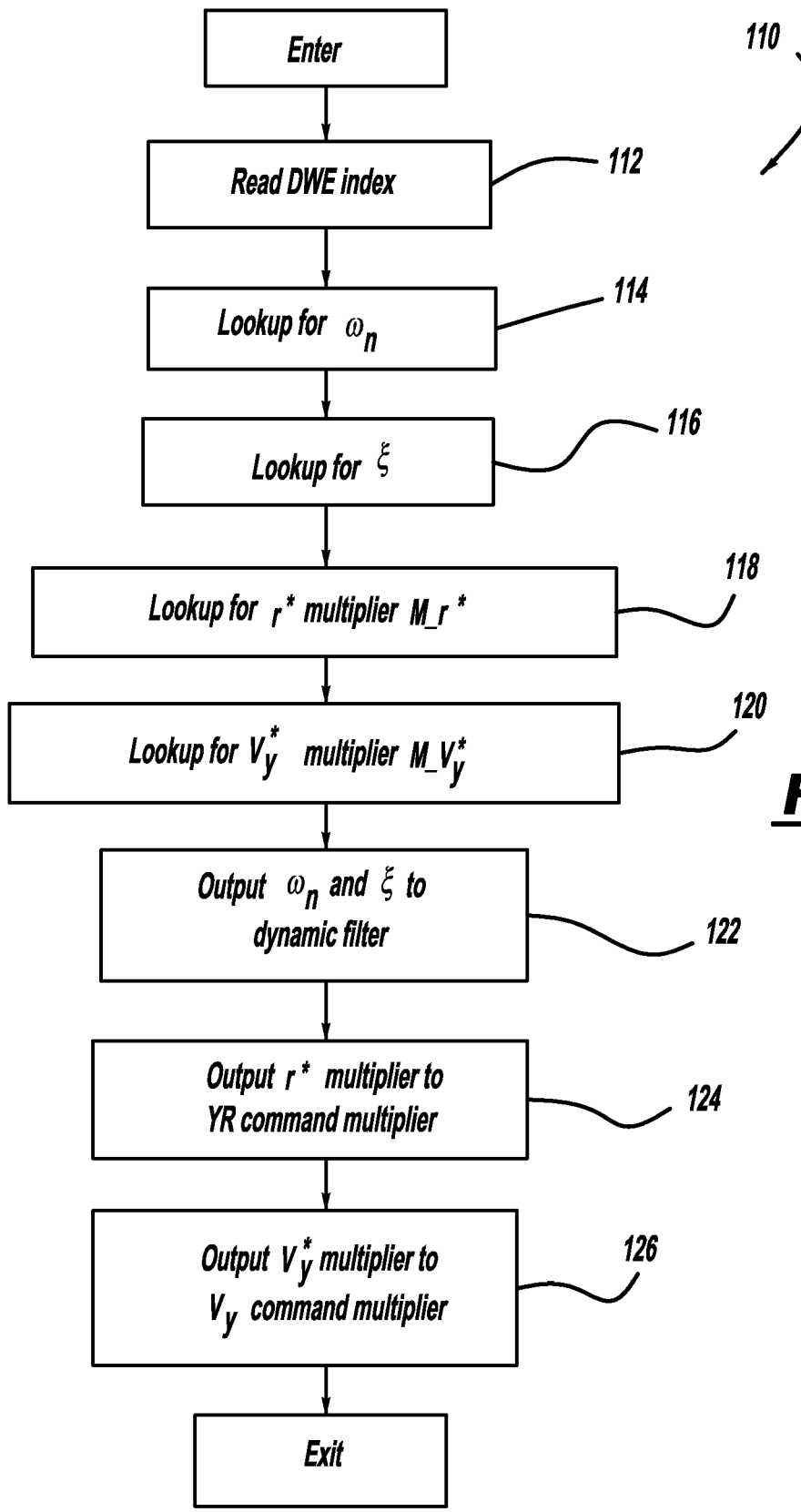
FIG. 7 is a flow chart diagram showing a process for determining a yaw rate command multiplier and a side-slip command multiplier for the command interpreter shown in FIG. 5.
Figure 8:
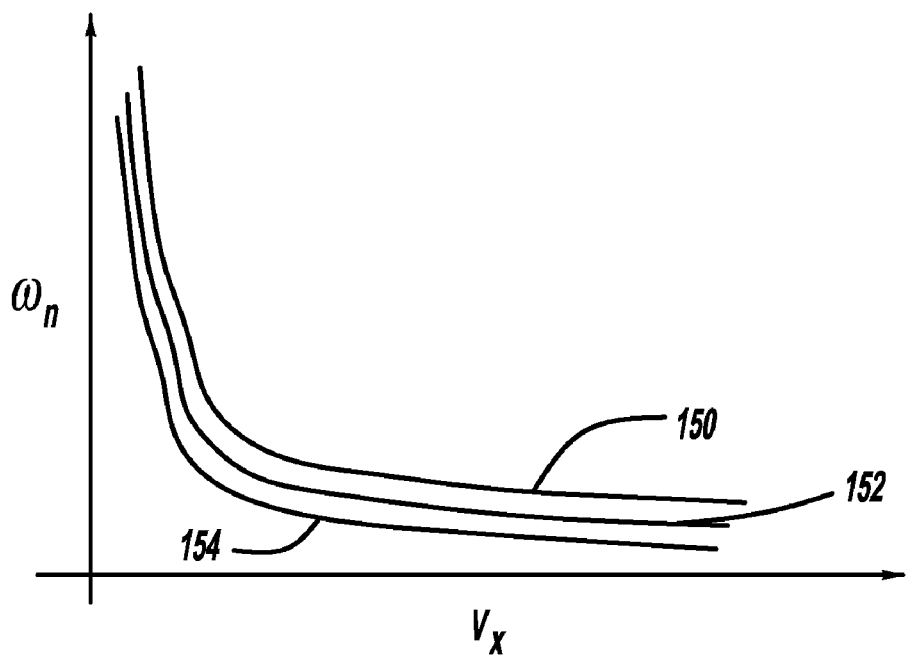
FIG. 8 is a graph with vehicle speed on the horizontal axis and natural frequency on the vertical axis that is used for determining the natural frequency based on vehicle speed and a driver workload estimation index.
Figure 9:
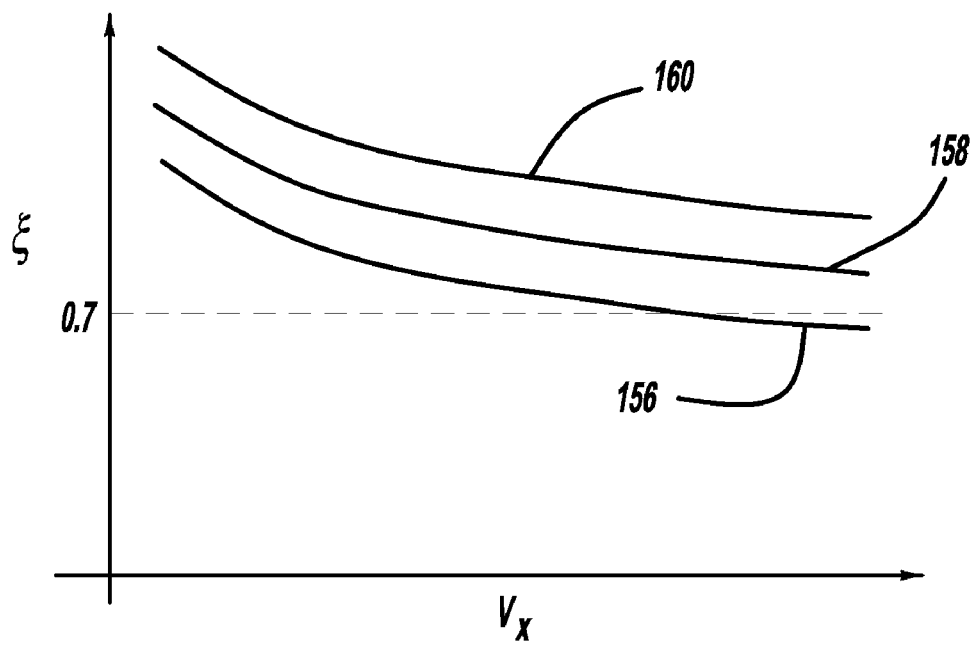
FIG. 9 is a graph with vehicle speed on the horizontal axis and damping ratio on the vertical axis that is used to identify the damping ratio based on vehicle speed and a driver workload estimation index.

FIG. 7 is a flow chart diagram 110 showing a process for generating the desired yaw rate signal r* in the yaw rate command generator 70 and the desired vehicle side-slip velocity signal $V^*_y$ in the side-slip command generator 72. The control command adaptation processor 82 reads the DWE index from the driver workload estimator at box 112. The algorithm in the control command adaptation processor 80 uses the DWE index and a look-up table to provide the natural frequency $\omega_n$ at box 114 and the damping ratio λ at box 116. FIG. 8 is a graph with vehicle speed on the horizontal axis and natural frequency $\omega_n$ on the vertical axis that includes three graph lines 150, 152 and 154. The graph can be used to determine the natural frequency $\omega_n$ based on vehicle speed and the DWE index, where the graph line 150 is for a low DWE index, the graph line 152 is for a medium DWE index and the graph line 154 is for a high DWE index. FIG. 9 is a graph with vehicle speed on the horizontal axis and damping ratio ξ on the vertical axis that includes three graph lines 156, 158 and 160. The graph can be used to determine the damping ratio based on vehicle speed and the DWE index, where the graph line 156 is for a low DWE index, the graph line 158 is for a medium DWE index and the graph line 160 is for a high DWE index.

The algorithm then uses a look-up table to identify the desired yaw rate multiplier M_r* and the desired side-slip multiplier $M\_V^*_y$ at boxes 118 and 120, respectively. Table I below gives representative examples of these multipliers for the three DWE indexes, where the DWE index 1 is for a low driver workload, the DWE index 2 is for an average driver workload and the DWE index 3 is for a high driver workload. The algorithm then outputs the natural frequency $\omega_n$ and the damping ratio ξ to the dynamic filters 78 and 80 at box 122. The algorithm then outputs the desired yaw rate multiplier M_r* from the filter 78 to the yaw rate command multiplier 84 at box 124 and the desired side-slip multiplier $M\_V^*_y$ from the filter 80 to the side-slip command multiplier 86 at box 126.

TABLE I

| M_r* | 1 | 0.9 | 0.8 |
|---|---|---|---|
| DWE | 1 | 2 | 3 |
| $M\_V^*_y$ | 1 | 0.8 | 0.6 |
| DWE | 1 | 2 | 3 |

Figure 10:
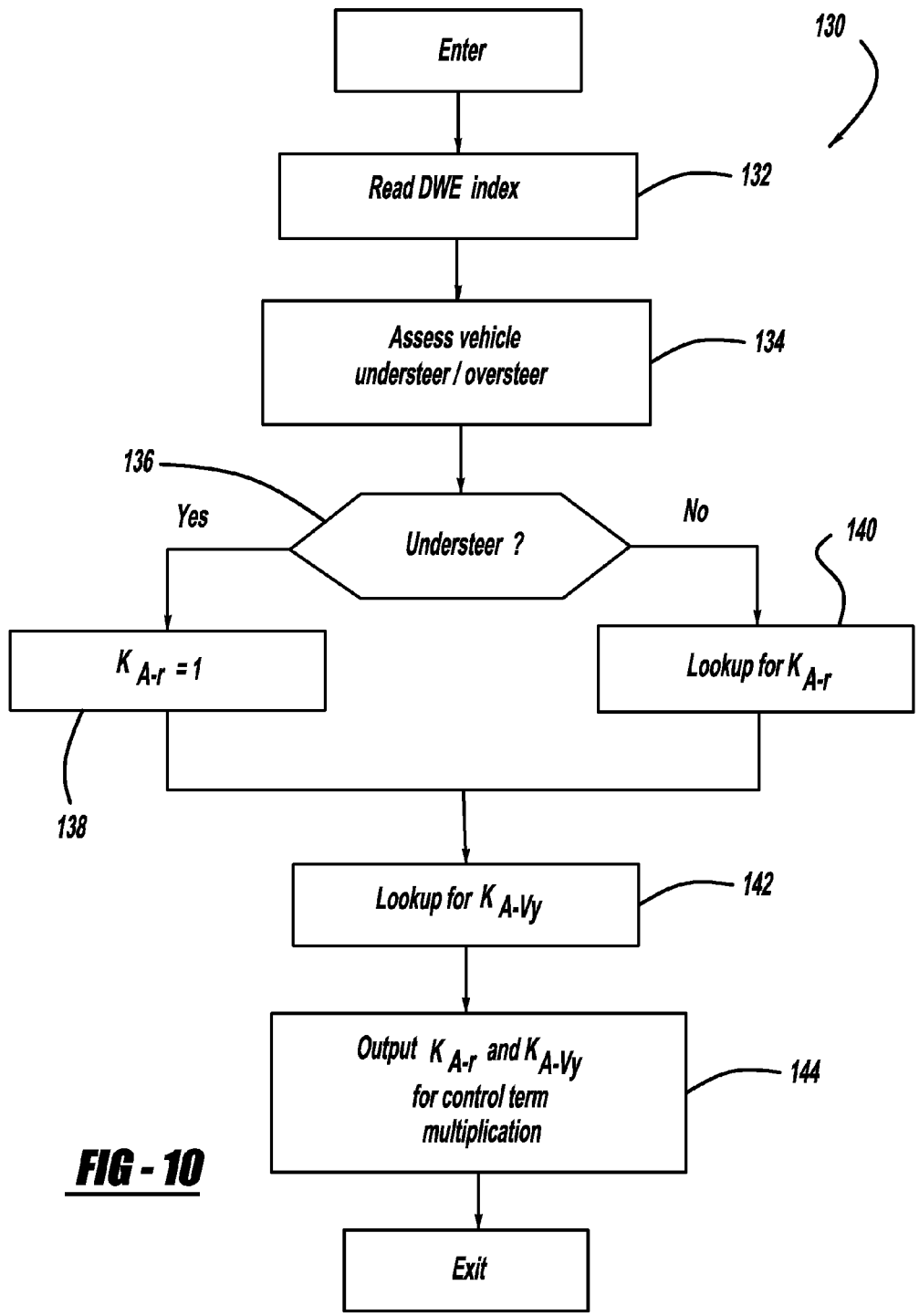
FIG. 10 is a flow chart diagram showing a process for modifying the control gain based on the driver workload estimation for the feedback control processor shown in FIG. 6.

FIG. 10 is a flow chart diagram 130 showing a process for providing the yaw rate feedback multiplier $K_{A-r}$ and the lateral dynamic feedback multiplier $K_{A-Vy}$ from the control gain adaptation processor 102. The control gain adaptation algorithm reads the DWE index from the estimator processor 58 at box 132. The algorithm then determines the vehicle understeer/oversteer coefficient at box 134. The algorithm then determines whether the vehicle is in an understeer condition at decision diamond 136, and if so sets the yaw-rate feedback multiplier $K_{A-r}$ to 1 at box 138. If there is no understeer condition, then the algorithm goes to a look-up table to provide the yaw-rate feedback multiplier $K_{A-r}$ at box 140 based on the DWE index. Table II below gives representative values of the multiplier $K_{A-r}$ for the three DWE indexes referred to above. The algorithm then goes to a look-up table to determine the lateral dynamics feedback multiplier $K_{A-Vy}$ at box 172 based on the DWE index, which can also be obtained from Table II. The algorithm then outputs the multipliers $K_{A-r}$ and $K_{A-Vy}$ to the multipliers 104 and 106, respectively, at box 144.

TABLE II

| $K_{A-r}$ | 1 | 1.2 | 1.5 |
|---|---|---|---|
| DWE | 1 | 2 | 3 |
| $K_{A-Vy}$ | 1 | 1.3 | 1.6 |
| DWE | 1 | 2 | 3 |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle stability enhancement system configured to provide vehicle stability control for a vehicle, said system comprising:

a driver workload estimator configured to provide a driver workload estimation signal indicative of the workload of a driver driving the vehicle, wherein the driver workload estimator sets the driver workload estimation signal to a first value if the vehicle speed is below 5 mph, sets the driver workload estimation signal to a second value if the vehicle speed is greater than or equal to 5 mph and less than 20 mph and sets the driver workload estimation signal to a third value if the vehicle speed is greater than or equal to 20 mph, where the first value indicates a low driver workload, the second value indicates an average driver workload and the third value indicates a high driver workload;

a command interpreter responsive to vehicle operation signals and the driver workload estimation signal, said command interpreter configured to generate a desired yaw rate signal and a desired side-slip signal, wherein said command interpreter includes a yaw rate command generator and a side-slip command generator, said yaw rate command generator including a first filter responsive to a steady-state yaw rate signal and using a damping ratio and a natural frequency to filter the steady-state yaw rate signal, said side-slip command generator including a second filter responsive to a steady-state side-slip signal and using the damping ratio and the natural frequency to filter the steady-state side-slip signal, said command interpreter further including a control command adaptation processor responsive to the driver workload estimation signal, where the control command adaptation processor changes the damping ratio and the natural frequency in the first and second filters depending on the driver workload estimation signal; and a feedback control processor responsive to the driver workload estimation signal, the desired yaw rate signal, the desired side-slip signal, a measured yaw rate signal and a measured side-slip signal, said feedback control processor configured to generate a stability control signal to control the vehicle.

2. The system according to claim 1 wherein the feedback control processor generates a first error signal as the difference between the desired yaw rate signal and the measured yaw rate signal and a second error signal as the difference between the desired side-slip signal and the measured side-slip signal, said feedback control processor including a first look-up table that provides a yaw rate gain signal in response to the yaw rate error signal and a second look-up table that provides a side-slip gain signal in response to the side-slip error signal, said feedback control processor further including a first multiplier that multiplies the yaw rate error signal times the yaw rate gain signal to generate a yaw rate stability signal and a second multiplier that multiplies the side-slip error signal times the side-slip gain signal to generate a side-slip stability signal, said feedback control processor further including a control gain adaptation processor responsive to the driver workload estimation signal and generates a yaw rate multiplier factor and a side-slip multiplier factor, said feedback control processor further including a third multiplier that multiplies the yaw rate stability signal times the yaw rate multiplier factor to generate a modified yaw rate stability signal and a fourth multiplier that multiplies the side-slip stability signal times the side-slip multiplier factor to generate a modified side-slip stability signal, said feedback control processor further including an adder that adds the modified yaw rate stability signal and the modified side-slip stability signal to generate the stability control signal.

3. The system according to claim 2 wherein the feedback control processor determines whether the vehicle is in an understeer condition before it determines the yaw rate multiplier factor, and sets the yaw rate multiplier factor to 1 if the vehicle is in an understeer condition.

4. The system according to claim 1 wherein the vehicle operation signals include a vehicle speed signal and a handwheel angle signal.

5. A vehicle stability enhancement system configured to provide vehicle stability control for a vehicle, said system comprising:
 a driver workload estimator configured to provide a driver workload estimation signal indicative of the workload of a driver driving the vehicle, wherein the driver workload estimator considers several factors for determining the driver workload estimation signal, said factors are selected from the group consisting of vehicle speed, ambient light, steering angle, lateral acceleration, lane position, driver gaze position, driver pupil diameter, inclement weather, traffic fluidity, road geometry and driver behavior;
 a command interpreter responsive to vehicle operation signals and the driver workload estimation signal, said driver workload estimation signal changing a damping ratio and a natural frequency in a filter in the command interpreter to adjust the vehicle operation signals depending on the workload of the driver provided by the driver workload estimation signal, said command interpreter generating at least one desired vehicle response signal; and
 a feedback control processor responsive to the driver workload estimation signal, the at least one desired vehicle response signal and at least one measured vehicle response signal, said feedback control processor configured to generate;
 at least one vehicle stability signal based on the at least one desired vehicle response signal and at least one measured vehicle response signal;
 at least one multiplication factor based on the driver workload estimation signal;
 at least one modified stability control signal based on the at least one vehicle stability signal and the at least one multiplication factor; and
 a stability control signal to control the vehicle based on one or more of the at least one modified stability control signals.

6. The system according to claim 5 wherein the at least one desired vehicle response signal is a desired yaw rate signal and a desired side-slip signal, the at least one measured vehicle response signal is a yaw rate signal and a side-slip signal, the at least one vehicle stability signal is a yaw rate vehicle stability signal and a side slip vehicle stability signal, the at least one multiplication factor is a yaw rate multiplier factor and a side-slip multiplier factor, the at least one modified stability control signal is a modified yaw rate vehicle stability signal and a modified side slip vehicle stability signal, and wherein the stability control signal is based on a combination of the modified yaw rate vehicle stability signal and the modified side slip vehicle stability signal.

7. A vehicle stability enhancement system configured to provide vehicle stability control for a vehicle, said system comprising:
 a driver workload estimator configured to provide a driver workload estimation signal indicative of the workload of a driver driving the vehicle;
 a command interpreter responsive to vehicle operation signals and the driver workload estimation signal, said command interpreter generating a desired yaw rate signal and a desired side-slip signal; and
 a feedback control processor responsive to the driver workload estimation signal, the desired yaw rate signal, the desired side-slip signal, a measured yaw rate signal and a measured side-slip signal, said feedback control processor configured to generate a stability control signal for controlling the vehicle, said feedback control processor generating a first error signal as the difference between the desired yaw rate signal and the measured yaw rate signal and a second error signal as the difference between the desired side-slip signal and the measured side-slip signal, said feedback control processor including a first look-up table that provides a yaw rate gain signal in response to the yaw rate error signal and a second look-up table that provides a side-slip gain signal in response to the side-slip error signal, said feedback control processor further including a first multiplier that multiplies the yaw rate error signal times the yaw rate gain signal to generate a yaw rate stability signal and a second multiplier that multiplies the side-slip error signal times the side-slip gain signal to generate a side-slip stability signal, said feedback control processor further including a control gain adaptation processor responsive to the driver workload estimation signal and generates a yaw rate multiplier factor and a side-slip multiplier factor, said feedback control processor further including a third multiplier that multiplies the yaw rate stability signal times the yaw rate multiplier factor to generate a modified yaw rate stability signal and a fourth multiplier that multiplies the side-slip stability signal times the side-slip multiplier factor to generate a modified side-slip stability signal.

8. The system according to claim 7 wherein the feedback control processor further includes an adder that adds the modified yaw rate stability signal and the modified side-slip stability signal to generate the stability control signal.

9. The system according to claim 7 wherein the feedback control processor determines whether the vehicle is in an understeer condition before it determines the yaw rate multiplier factor, and sets the yaw rate multiplier factor to 1 if the vehicle is in an understeer condition.

10. The system according to claim 7 wherein the driver workload estimator generates the driver workload estimation signal based on environmental factors.

11. The system according to claim 7 wherein the driver workload estimator generates the driver workload estimation signal based on the speed of the vehicle.

12. The system according to claim 7 wherein the driver workload estimator generates the driver workload estimation signal based on the driver's behavior.

13. The system according to claim 12 wherein a driver workload estimation index is generated offline based on the driver's behavior where the driver's behavior is mapped to driver workload estimation indexes.

* * * * *